US009516755B2

(12) United States Patent  (10) Patent No.: US 9,516,755 B2
Lam et al.  (45) Date of Patent: Dec. 6, 2016

(54) MULTI-CHANNEL MEMORY MODULE (71) Applicant: Intel Corporation, Santa Clara, CA (US)

(72) Inventors: Hue V. Lam, Portland, OR (US); Loc V. Doan, Vancouver, WA (US)

(73) Assignee: Intel Corporation, Santa Clara, CA (US)

( * ) Notice: Subject to any disclaimer, the term of this patent is extended or adjusted under 35 U.S.C. 154(b) by 379 days.

(21) Appl. No.: 13/730,505

(22) Filed: Dec. 28, 2012

(65) Prior Publication Data

US 2014/0185226 A1 Jul. 3, 2014

(51) Int. Cl.
| | |
|---|---|
| *H05K 1/14* | (2006.01) |
| *G11C 5/04* | (2006.01) |
| *G06F 21/86* | (2013.01) |
| *H05K 1/11* | (2006.01) |
| *H05K 3/36* | (2006.01) |

(52) U.S. Cl.
CPC ............ *H05K 1/141* (2013.01); *G06F 21/86* (2013.01); *G11C 5/04* (2013.01); *H05K 1/117* (2013.01); *H05K 3/368* (2013.01); *H05K 2201/041* (2013.01); *H05K 2201/10098* (2013.01); *H05K 2201/10159* (2013.01); *H05K 2201/10409* (2013.01)

(58) Field of Classification Search
CPC .................. H05K 2201/10325; H05K 5/0286; H05K 7/10; H01R 23/6806
See application file for complete search history.

(56) References Cited

U.S. PATENT DOCUMENTS

| | | | |
|---|---|---|---|
| 5,962,930 A | 10/1999 | Cluff et al. | |
| 6,049,467 A * | 4/2000 | Tamarkin et al. | 361/790 |

(Continued)

FOREIGN PATENT DOCUMENTS

| | | |
|---|---|---|
| JP | 2008-141200 A | 6/2008 |
| WO | WO 2006/028643 A2 | 3/2006 |

OTHER PUBLICATIONS

PCT International Search Report for PCT/US2013/045688 mailed Sep. 23, 2013, (7 pages).

(Continued)

*Primary Examiner* — Xanthia C Cunningham
(74) *Attorney, Agent, or Firm* — Blakely, Sokoloff, Taylor & Zafman LLP (57) ABSTRACT

Embodiments of the invention describe a motherboard PCB having a memory bus to receive signal data from a channel of memory chips/devices of a memory module. Electrical contacts, communicatively coupled to the memory bus, securely couple the PCB to the memory chips/devices of the memory module. Embodiments of the invention further include a receiving housing that includes said electrical contacts and has a height less or equal to the height of the memory module. Embodiments of the invention further describe a memory module having a memory card housing, first and second pluralities of memory chips/devices included in the housing, and first and second pluralities of memory module electrical EO terminals for coupling the first and second pluralities of memory chips/devices to PCB, respectively. In embodiments of the invention, the above described first and second pluralities electrical EO connectors are disposed on different sides of the housing.

20 Claims, 6 Drawing Sheets

(56) References Cited

U.S. PATENT DOCUMENTS

| | | | |
|---|---|---|---|
| 6,457,647 B1 * | 10/2002 | Kurihashi | G06K 7/0047 235/441 |
| 6,590,781 B2 * | 7/2003 | Kollipara et al. | 361/760 |
| 6,597,062 B1 * | 7/2003 | Li | G11C 5/063 257/686 |
| 6,853,557 B1 * | 2/2005 | Haba et al. | 361/760 |
| 7,298,625 B1 * | 11/2007 | Wu et al. | 361/735 |
| 7,486,279 B2 | 2/2009 | Wong et al. | |
| 7,626,358 B2 | 12/2009 | Lam et al. | |
| 7,659,606 B2 * | 2/2010 | Klatt | H05K 5/0269 235/384 |
| 7,869,243 B2 * | 1/2011 | Bacha | 365/63 |
| 7,969,117 B2 | 6/2011 | Lam et al. | |
| 2003/0011391 A1 * | 1/2003 | Brunelle et al. | 324/755 |
| 2003/0081387 A1 * | 5/2003 | Schulz | 361/728 |
| 2004/0069984 A1 * | 4/2004 | Estes et al. | 257/25 |
| 2004/0156174 A1 * | 8/2004 | Rubenstein et al. | 361/705 |
| 2005/0128701 A1 | 6/2005 | Wu | |
| 2005/0283661 A1 | 12/2005 | Wong et al. | |
| 2006/0019518 A1 | 1/2006 | Lam et al. | |
| 2006/0033636 A1 | 2/2006 | Kwong et al. | |
| 2006/0131070 A1 | 6/2006 | Wong et al. | |
| 2006/0139891 A1 | 6/2006 | Gauche et al. | |
| 2007/0153824 A1 | 7/2007 | Wong et al. | |
| 2007/0162660 A1 | 7/2007 | Kwong et al. | |
| 2007/0230101 A1 | 10/2007 | Wong et al. | |
| 2008/0123305 A1 * | 5/2008 | Amidi et al. | 361/737 |
| 2008/0251338 A1 | 10/2008 | Golden et al. | |
| 2009/0135139 A1 | 5/2009 | Wong et al. | |
| 2009/0142944 A1 * | 6/2009 | Zhu | H01R 27/00 439/79 |
| 2010/0162037 A1 * | 6/2010 | Maule et al. | 714/5 |
| 2011/0122030 A1 * | 5/2011 | Suzuki | H01Q 1/1207 343/702 |
| 2013/0250507 A1 * | 9/2013 | Ito et al. | 361/679.32 |

OTHER PUBLICATIONS

PCT International Written Opinion for PCT/US2013/045688 mailed Sep. 23, 2013, (7 pages).

* cited by examiner

MULTI-CHANNEL MEMORY MODULE

FIELD

Embodiments of the invention generally pertain computing devices and more particularly to memory module design and interfaces.

BACKGROUND

Memory modules, such as Dual In-line Memory Modules (DIMMs), are used by computing devices for the storage and retrieval of data. DIMMs with a reduced form factor, such as Small Outline Dual In-line Memory Modules (SODIMMs), are used by mobile computing devices.

As mobile computing devices decrease in form factor, memory modules and memory module coupling solutions, such as straddle mount DIMM sockets, limit how much device sizes can be reduced. Current memory module coupling solutions only support one channel per module, increase the dimensions of the host device's motherboard, and require the host device's motherboard to have cut-outs. What is needed is a memory module coupling solution that does not impact the dimensions of the host motherboard and allows for more efficient memory module design solutions.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DESCRIPTION

Embodiments of the invention describe memory module and memory module coupling solutions having a reduced form factor compared to prior art solutions. Embodiments of the invention include a motherboard (alternatively referred to herein as "main board") printed circuit board (PCB) having a memory bus to receive signal data from a channel of memory chips/modules/devices of a memory module. Said motherboard PCB further includes a plurality of electrical contacts, electrically coupled to the memory bus, for communicatively coupling the memory module to the PCB. For securely coupling the memory module to the PCB, embodiments of the invention further include a receiving housing (alternatively referred to herein as a "module connector" or a "DIMM connector" for embodiments utilizing Dual In-line connectors) that includes the plurality of electrical contacts, wherein the receiving housing comprises a height less than or equal to the height of the memory module.

Embodiments of the invention further describe a multi-channel memory module having a memory card housing with a plurality of sides, a first plurality of memory chips/modules/devices included in the housing, a second plurality of memory chips/modules/devices included in the housing, a first plurality of memory module electrical terminals for coupling the first plurality of memory chips/modules/devices to a memory module connector of motherboard PCB, and a second plurality of memory module electrical terminals for coupling the second plurality of memory chips/modules/devices to the memory module connector of the motherboard PCB. In embodiments of the invention, the above described first and second pluralities of memory module electrical terminals are disposed on different sides of the housing, thereby enabling the motherboard PCB to interface with a plurality of memory channels while being coupled to a single memory module. As described in further detail below, multi-channel memory modules according to embodiments of the invention are not limited to Dual In-line configurations (i.e., Dual In-line Memory Module (DIMM) configurations).

In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
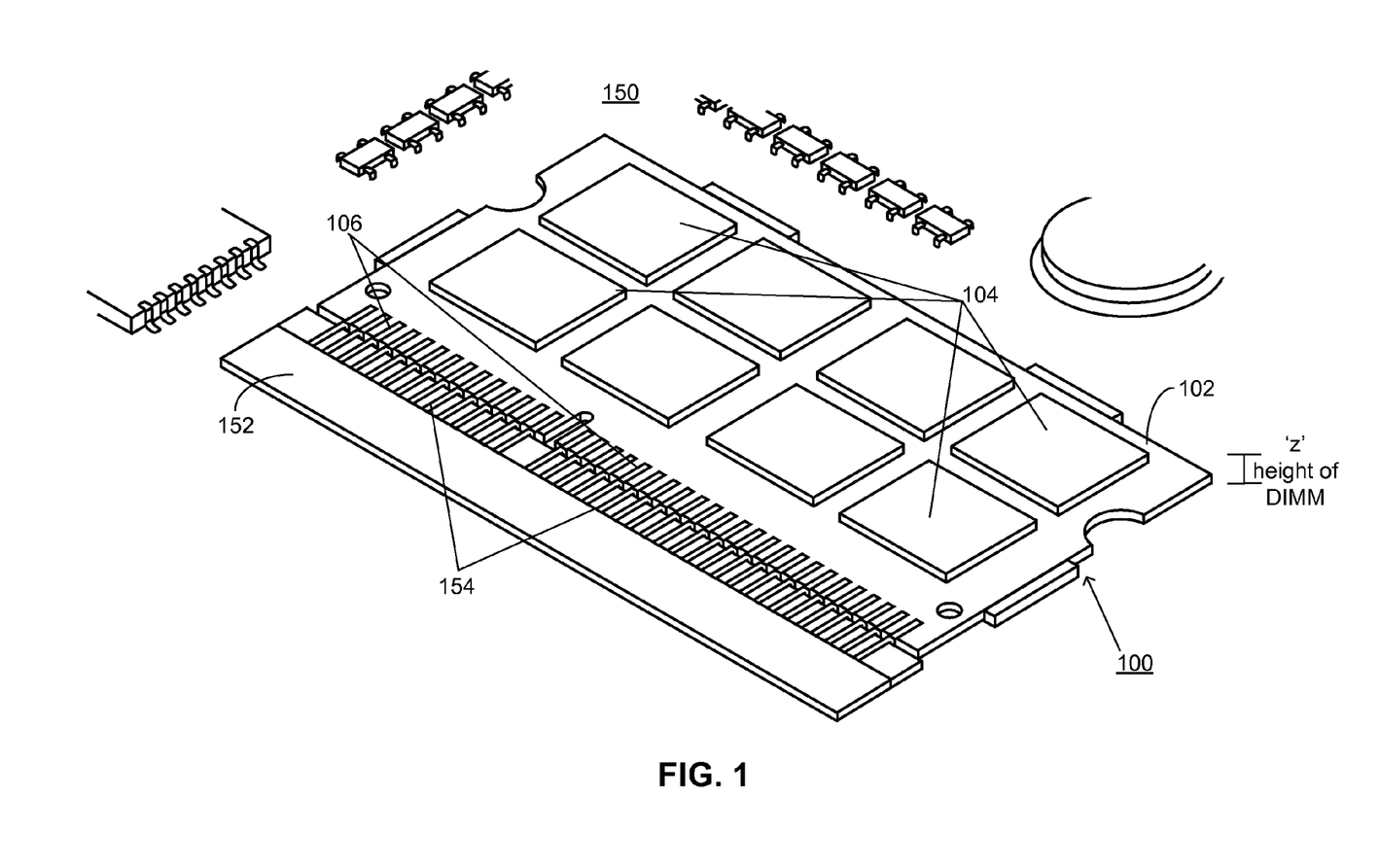
FIG. 1 is an illustration of a memory module and a memory module coupling component according to an embodiment of the invention.

FIG. 1 is an illustration of a memory module and a memory module coupling component according to an embodiment of the invention. In this embodiment, memory unit 100 comprises PCB memory housing card 102, array of memory chips/modules 104 (alternatively referred to herein as 'devices'), and memory unit electrical input/output (I/O) terminals 106 for providing connections to computer interface signals of the host computing device (described below). In this embodiment, memory unit 100 may comprise a DIMM or any other memory module configuration.

In this embodiment, electrical I/O terminals 106 are disposed on one exterior side of memory housing card 102. Said electrical I/O terminals (alternatively referred to herein as 'pads' or 'pins') are electrically coupled to electrical terminals of the memory chips/modules along internal communication pathways (not shown) on the memory housing card.

Said modules/chips of memory module 100 may comprise any form of random access memory (RAM), such as dynamic random access memory (DRAM), synchronous DRAM (SDRAM) or static random access memory (SRAM), and may be formed from any type of memory cells, such as silicon memory cells, Phase Change Memories (PCM), PCM comprised of arrays of phase change memory cells and switches (PCMS), silicon nanowire-based non-volatile memory cells, ferroelectric transistor random access memory (FeTRAM) (i.e., silicon nanowires with a "ferroelectric" polymer, a material that switches polarity when electric fields are applied), etc.

In this illustration, and other illustrations described below, the number of electrical I/O terminals illustrated on a memory module is for illustrative purposes only, and is not meant to describe or limit the number of I/O contacts on memory modules according to embodiments of the invention. For example, embodiments of the invention may utilize memory modules having one hundred forty four electrical terminals disposed along a card edge, as is commonly used in the art. The quantity of electrical I/O terminals on the illustrated memory module has been selected for the purposes of illustrative clarity only.

Memory module 100 is to be securely coupled to (i.e., installed on) computing device motherboard (i.e., main board) PCB 150 via coupling component (i.e., memory module connector) 152, which also conductively couples memory module electrical I/O terminals 106 to computer interface signals of the host computing device, thereby allowing for the storage of and retrieval of data to/from modules 104 of memory module 100. As generally understood in the art, a memory controller of the host device (not shown) communicates with memory module 100 to read and write to selected memory chips/modules of the memory module using, for example, I/O signals in combination with chip select (CS) signals.

As shown in this embodiment, memory module 100 is shown to be laid flat on PCB 150, so that the z-height of the memory module adds additional z-height to the computing device PCB when installed. In other embodiments, PCB 150 may include a cut-out to accommodate memory module 100 in order to reduce or eliminate the additional z-height shown in this embodiment. Prior art solutions utilize a straddle mount memory module socket connector where the motherboard under memory module has to be cut out. An alternative prior art solution is "memory down on motherboard." The disadvantages of these prior art solutions are that they limit configurability, they increase the cost of inventory to manufacturer, and they result in higher component cost due to lower volume. Prior art memory module coupling solutions also take more space on a motherboard, which restricts single-sided board designs. Embodiments of the invention eliminate the above limitations by supporting either one or multiple channel memory modules and in different memory module form factors compared to current solutions.

As shown in FIG. 1, memory module coupling component 152 has a z-height smaller than (or equal to) that of memory module 100; thus, coupling components according to embodiments of the invention do not add height to a mobile computing device PCB when used to securely couple (i.e., install) a memory module to the PCB.

In this embodiment, memory module coupling component 152 includes compression springs 154 having elastic springback properties for securely coupling memory module 100 to motherboard PCB 150. Compression springs 154 also serve as electrical contacts for providing a conductive connection between the motherboard PCB and the memory module, instead of a traditional dual in-line connector such as a connector socket. This allows the memory module to connect to more than one set of electrical terminals at the same time. Therefore, multi memory channels (more signals) can be routed to these connections without increasing the connector length or reducing the pin pitches.

Utilizing compression connectors 154 allows for memory module coupler 152 to not have any vertical confining structure, and therefore to not add height to motherboard PCB 150. As described above, in this embodiment said compression connectors have elastic springback properties for securely coupling memory module 100 and are conductive to communicatively couple the memory module to motherboard PCB 150. Said compression connectors may comprise any material having a flexible but resilient property such that a deflection of the conductive element will result in a biasing force being generated by the conductive element in a direction opposite to the direction of compression.

Figure 2A:
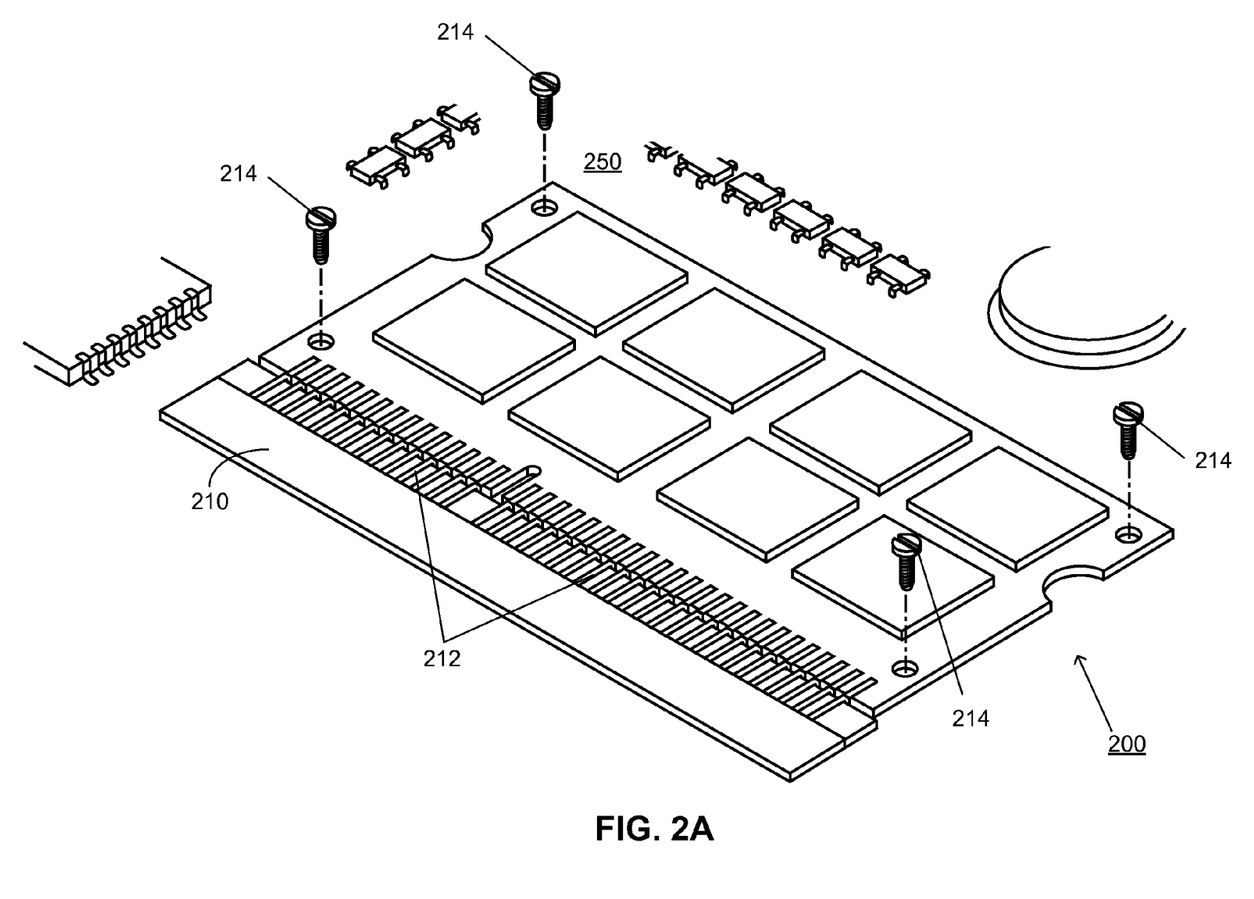
FIG. 2A and FIG. 2B are illustrations of memory module coupling components according to embodiments of the invention.
Figure 2B:
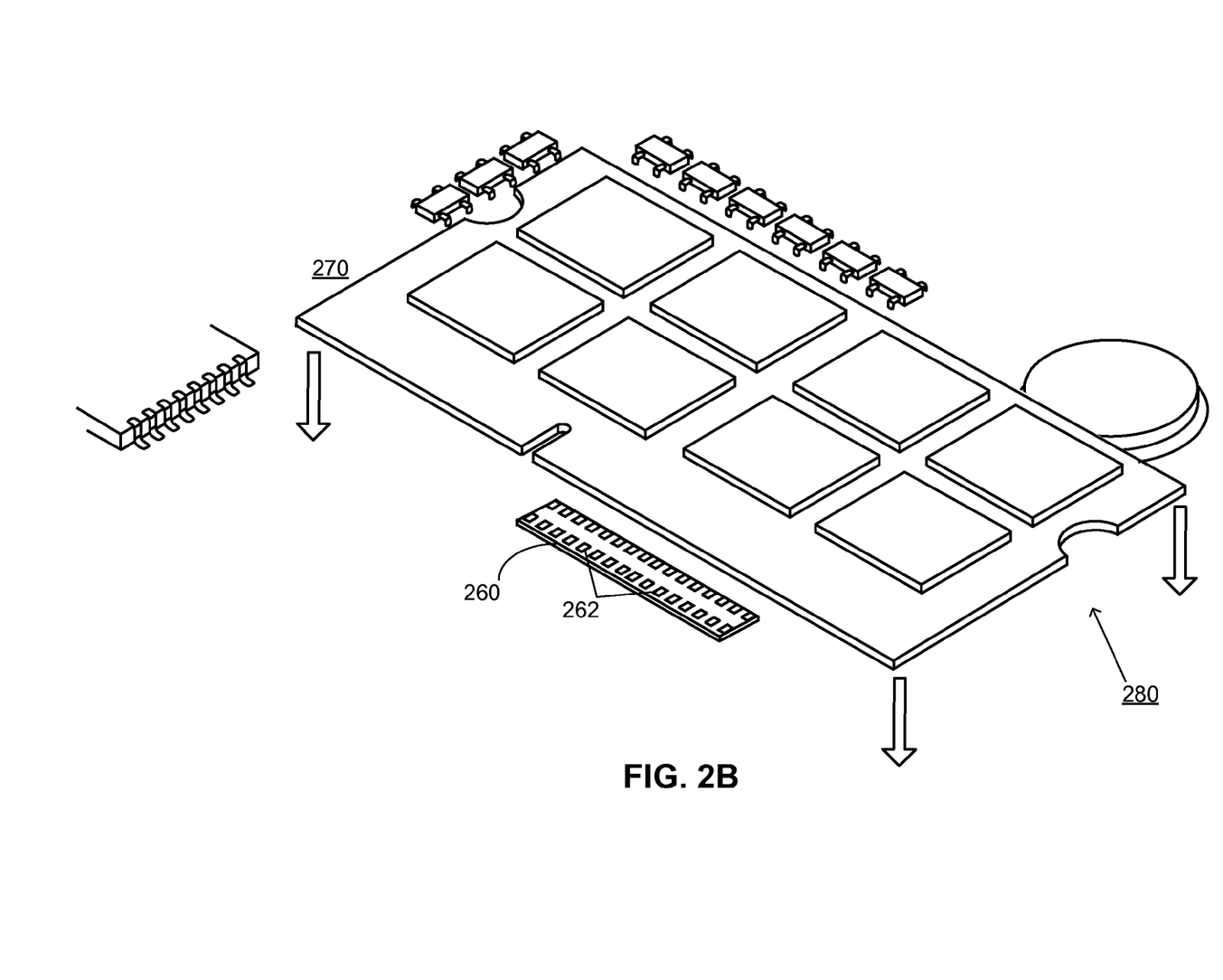

FIG. 2A and FIG. 2B are illustrations of memory module coupling components according to an embodiment of the invention. In the embodiment illustrated in FIG. 2A, memory module coupler 210 utilizes low-profile electrical contacts 212 and screws 214 securely coupling memory unit 200 to computing device motherboard PCB 250. Similar to the example embodiment of FIG. 1, in these example embodiments, memory module unit 200 may comprise a DIMM or any other memory module configuration.

Electrical contacts 212 may or may not partially secure memory module 200 to PCB 250 as well as provide a conductive connection between the memory module and a memory bus of the motherboard PCB; screws 214 also hold memory module 200 in place. The screw holes on memory module 200 may be constructed so that the head of screws 214 are not higher than the tallest component on the module top side. For example, in this embodiment, a dual surface-sided module is utilized, and therefore the heads of screws 214 do not extend beyond the height of the memory modules on the top side of memory module 200 when fully screwed-in; in an alternative embodiment utilizing a single surface-sided module, the screws' heads do not extend beyond the memory card PCB surface on the top side (i.e., the unpopulated surface-side) when fully screwed-in.

In the example embodiment illustrated in FIG. 2B, memory module coupler 260 of PCB 270 comprises a board-to-board connector. Board-to-board connectors may be described as coupling solutions comprising a receptacle connector and a plug connector which are mated with each other and mounted to a 'female' and a 'male' printed circuit board, respectively, to make the printed circuit boards electrically connected with each other. In this embodiment, memory module coupler 260 is the above described receptacle connector, shown to include electrical contacts 262 to communicatively couple to a plug connector of memory module 280 (not shown) in a stacked manner. Similar to the embodiment illustrated in FIG. 2B, said board-to-board connectors, when stacked, do not extend beyond the height of the top side of memory module 280 (e.g., memory module coupler 260 may comprise a low-profile connector, and/or the plug connector of memory module 280 may be recessed into the PCB of the memory module).

Figure 3:
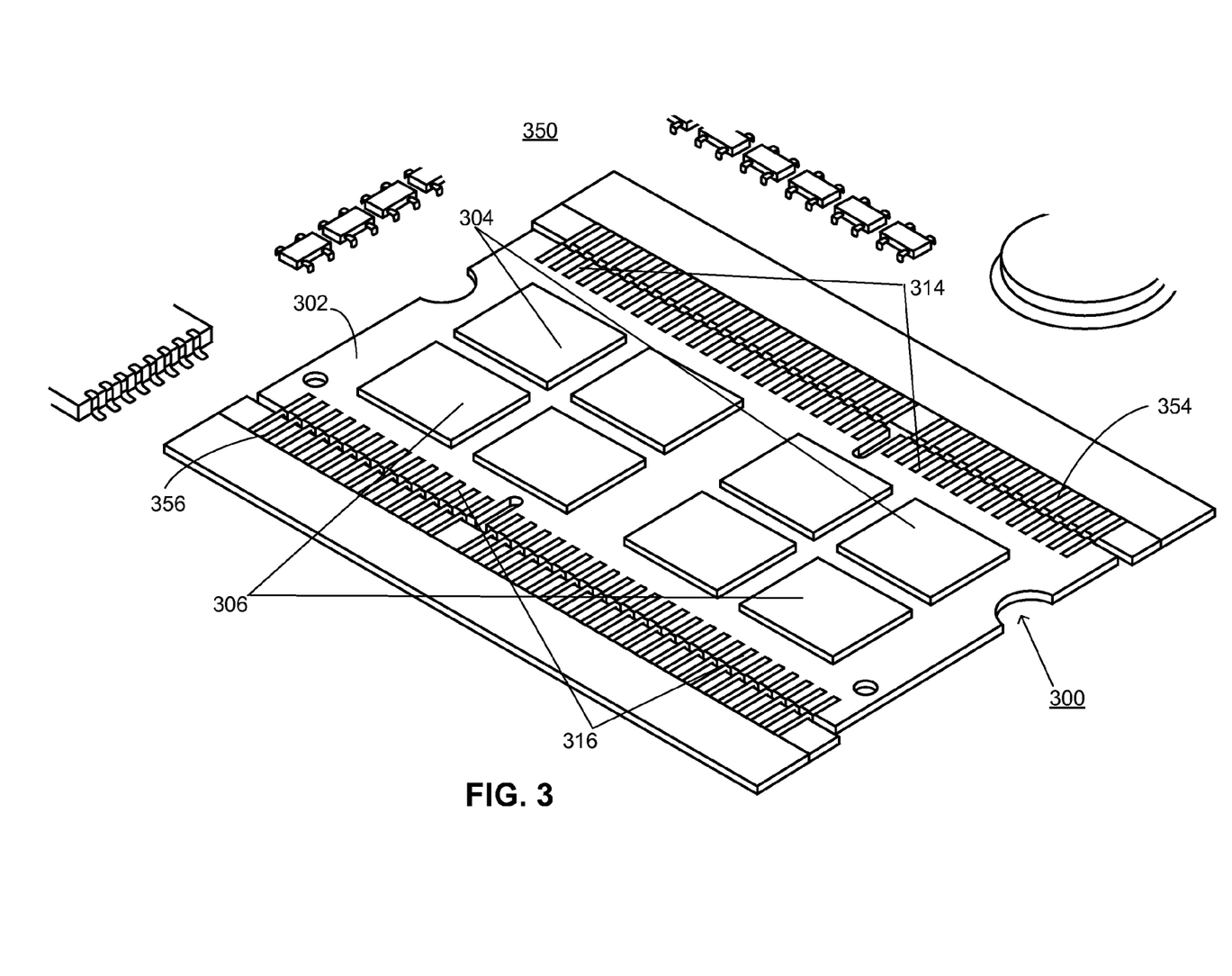
FIG. 3 is an illustration of a memory module and a memory module coupling component according to an embodiment of the invention.

FIG. 3 is an illustration of a memory module and a memory module coupling component according to an embodiment of the invention. In this embodiment, memory module 300 includes memory card PCB housing 302, memory module/chip rows 304 and 306, and electrical I/O terminals 314 and 316. The front surface of memory module 300 is shown. As described above, said memory module may comprise a dual-surface memory module, wherein another plurality of memory module rows would populate the down-facing surface (not shown), or a single-surface memory module. Furthermore, electrical I/O terminals of memory unit 300 may comprise any configuration (e.g., terminals only on the top-surface of housing 302—thereby comprising two sets of terminals, terminals on both surfaces—thereby comprising four sets of terminals, etc.).

In this embodiment, memory module rows 304 and 306 are shown to correspond to separate electrical I/O terminals placed on opposing exterior sides of memory module 300. Motherboard PCB 350 is shown to have two electrical contact sets, 354 and 356 (described below), for electrically coupling memory module rows 304 and 306 to a memory bus as separate "memory channels." In this embodiment, electrical I/O terminals 314 of memory module 300 are shown to correspond to memory module row 304, and electrical I/O terminals 316 of memory module 300 are shown to correspond to memory module row 306. Thus, memory modules according to embodiments of the invention provide the ability for multiple memory channels to be connected to a memory bus by utilizing only a single memory module.

Computing device PCB 350 is shown to have a memory module connector including two sets of electrical contacts, 354 and 356, for securely coupling exterior sides of memory module 300 to the PCB, as well as communicatively coupling the memory modules of the memory module to the PCB. Thus, in addition to reducing the added dimensions of current memory module solutions, embodiments of the invention allow for more than one memory channel to be utilized without increasing the number of memory modules installed in a PCB. This allows for memory modules to be used in place of (i.e., as a substitute for) on board memory, allowing computing device manufacturers to build to order capability and eliminating, for example, SDRAM being integrated on a motherboard.

Figure 4:
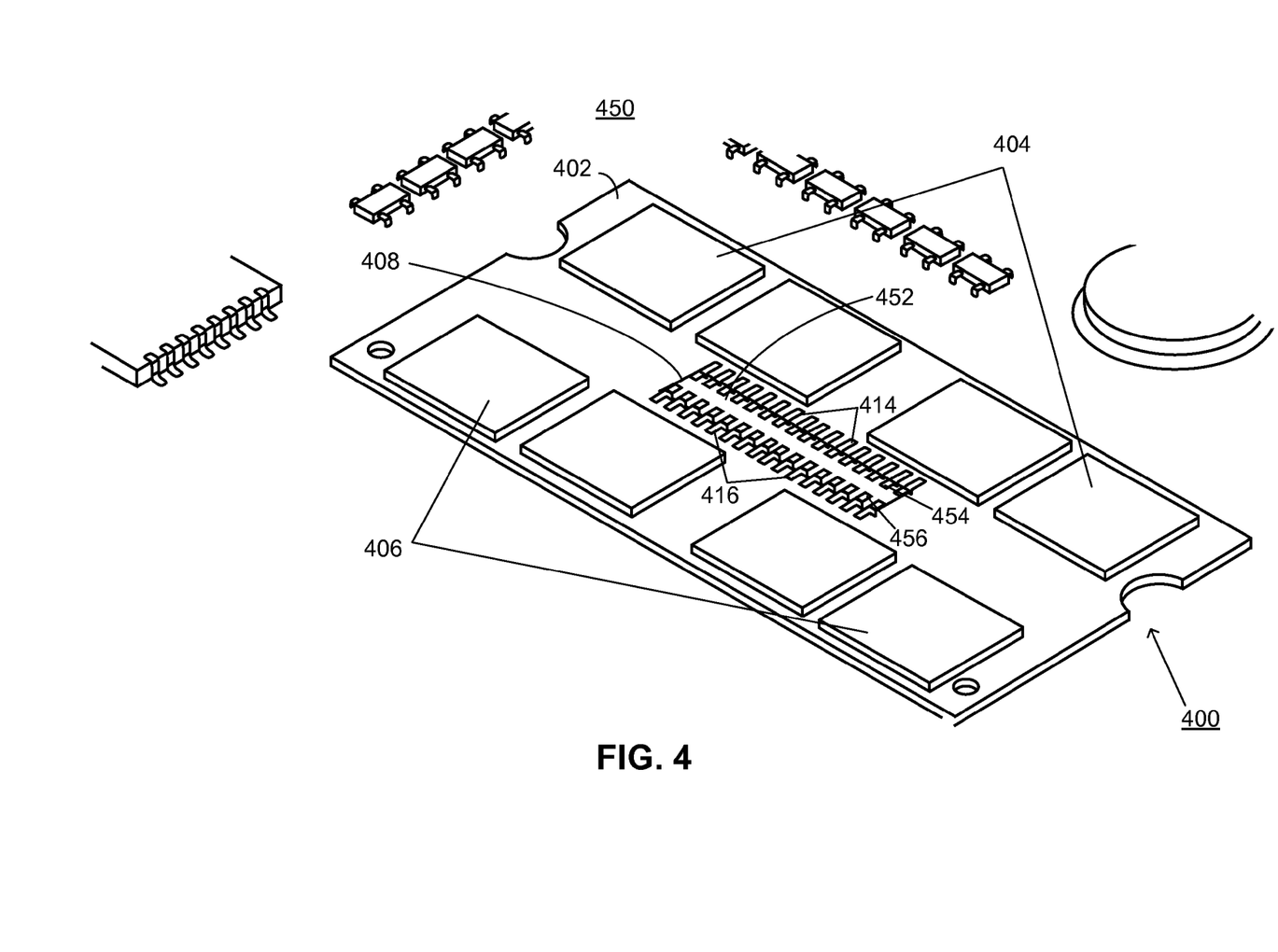
FIG. 4 is an illustration of a memory module and a memory module coupling component according to an embodiment of the invention.

FIG. 4 is an illustration of a memory module and a memory module coupling component according to an embodiment of the invention. As described above, embodiments of the invention allow multiple channels of a PCB to connect to a single memory module. As shown in this illustration, embodiments of the invention are not limited to having I/O electrical terminals to be placed at the edge of the module housing.

Memory module 400 is illustrated as having memory card PCB housing 402, memory module rows 404 and 406, and electrical I/O terminals 414 and 416. In this embodiment, memory module rows 404 and 406 are shown to have separate electrical I/O terminals placed on opposing interior sides of memory module 400 positioned in interior gap 408 (as opposed to having electrical I/O terminals placed on opposing exterior sides, such as memory module 300 of FIG. 3). In other embodiments, any combination of interior and exterior sides or surfaces of a memory module may include electrical I/O terminals.

In this embodiment, electrical I/O terminals 414 are shown to correspond to memory module row 404, while electrical I/O terminals 416 are shown to correspond to memory module row 406. Thus, memory modules according to embodiments of the invention provide the ability for multiple computing device memory channels to be connected to a single memory module.

Computing device PCB 450 is shown to have memory module connector including two sets of electrical contacts, 454 and 456, for securely coupling the interior sides of memory module 400 to the PCB, as well as communicatively coupling the memory modules of the memory module to a memory bus of the PCB. Said electrical contacts are including in housing 452; for example, said electrical contacts may comprise compression connectors for securely coupling memory module 400 to PCB 450 via interior gap 408. Thus, in addition to reducing the added dimensions of current memory module solutions, embodiments of the invention allow for varying designs of memory modules to be utilized by computing devices.

Figure 5:
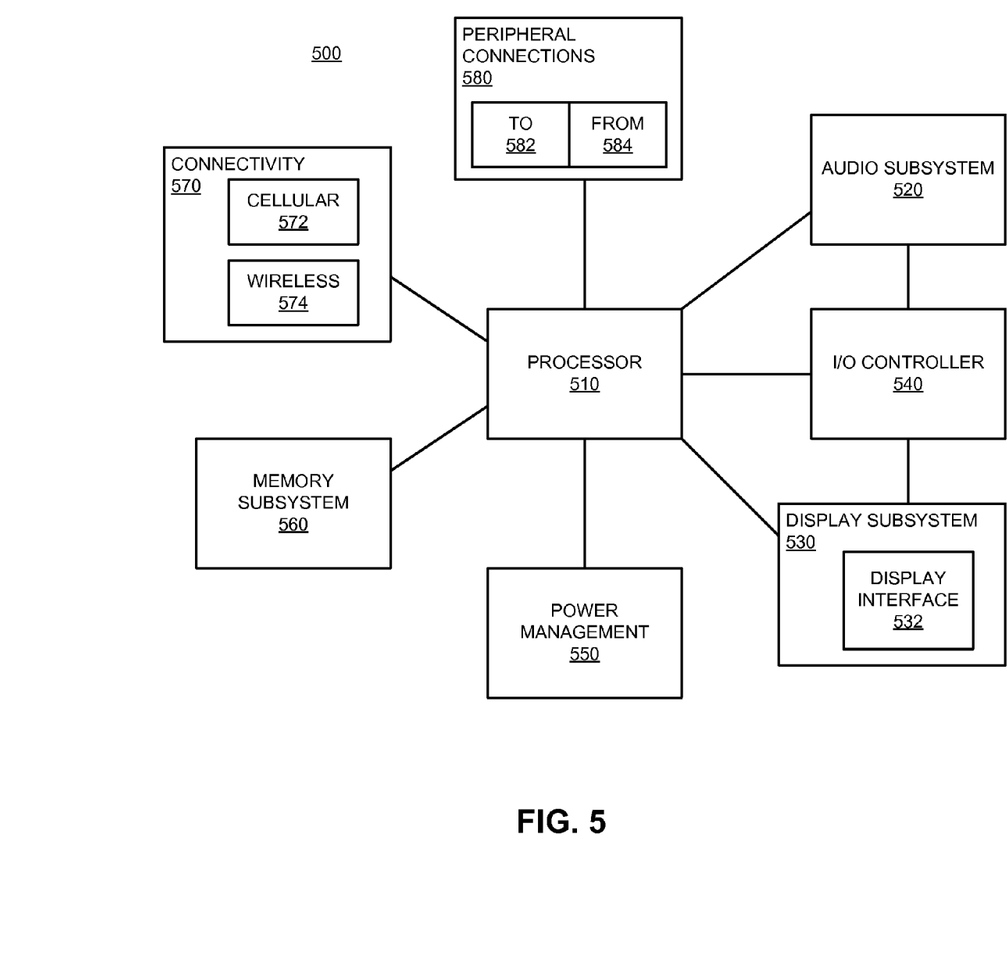
FIG. 5 is block diagram of a device to utilize an embodiment of the invention.

FIG. 5 is block diagram of a device to utilize an embodiment of the invention. Computing device 500 represents a mobile computing device, such as a computing tablet, a mobile phone or smartphone, a wireless-enabled e-reader, or other wireless mobile device. It will be understood that certain of the components are shown generally, and not all components of such a device are shown in device 500.

Device 500 includes processor 510, which performs the primary processing operations of device 500. Processor 510 can include one or more physical devices, such as microprocessors, application processors, microcontrollers, programmable logic devices, processor cores, or other processing means. The processing operations performed by processor 510 include the execution of an operating platform or operating system on which applications and/or device functions are executed. The processing operations include operations related to I/O (input/output) with a human user or with other devices, operations related to power management, and/or operations related to connecting device 500 to another device. The processing operations may also include operations related to audio I/O and/or display I/O.

In one embodiment, device 500 includes audio subsystem 520, which represents hardware (e.g., audio hardware and audio circuits) and software (e.g., drivers, codecs) components associated with providing audio functions to the computing device. Audio functions can include speaker and/or headphone output, as well as microphone input via any of the audio jacks described above. Devices for such functions can be integrated into device 500, or connected to device 500. In one embodiment, a user interacts with device 500 by providing audio commands that are received and processed by processor 510.

Display subsystem 530 represents hardware (e.g., display devices) and software (e.g., drivers) components that provide a visual and/or tactile display for a user to interact with the computing device. Display subsystem 530 includes display interface 532, which includes the particular screen or hardware device used to provide a display to a user. In one embodiment, display interface 532 includes logic separate from processor 510 to perform at least some processing related to the display. In one embodiment, display subsystem 530 includes a touchscreen device that provides both output and input to a user.

I/O controller 540 represents hardware devices and software components related to interaction with a user. I/O controller 540 can operate to manage hardware that is part of audio subsystem 520 and/or display subsystem 530. Additionally, I/O controller 540 illustrates a connection point for additional devices that connect to device 500 through which a user might interact with the system. For example, devices that can be attached to device 500 might include microphone devices, speaker or stereo systems, video systems or other display device, keyboard or keypad devices, or other I/O devices for use with specific applications such as card readers or other devices.

As mentioned above, I/O controller 540 can interact with audio subsystem 520 and/or display subsystem 530. For example, input through a microphone or other audio device can provide input or commands for one or more applications or functions of device 500. Additionally, audio output can be provided instead of or in addition to display output. In another example, if display subsystem includes a touch-screen, the display device also acts as an input device, which can be at least partially managed by I/O controller 540. There can also be additional buttons or switches on device 500 to provide I/O functions managed by I/O controller 540.

In one embodiment, I/O controller 540 manages devices such as accelerometers, cameras, light sensors or other environmental sensors, or other hardware that can be included in device 500. The input can be part of direct user interaction, as well as providing environmental input to the system to influence its operations (such as filtering for noise, adjusting displays for brightness detection, applying a flash for a camera, or other features).

Memory subsystem 560 includes memory devices for storing information in device 500. Memory can include nonvolatile (state does not change if power to the memory device is interrupted) and/or volatile (state is indeterminate if power to the memory device is interrupted) memory devices. Memory 560 can store application data, user data, music, photos, documents, or other data, as well as system data (whether long-term or temporary) related to the execution of the applications and functions of system 500. Memory subsystem 560, according to embodiments of the invention, includes a motherboard PCB having a memory bus to receive signal data from one or more channels of memory chips/modules of a memory module. A plurality of memory module I/O electrical terminals, electrical coupled to the electrical contacts of the PCB, couple said memory bus to the channel(s) of memory chips/modules of the memory module. For securely coupling the memory module to the motherboard PCB, embodiments of the invention further include a receiving housing that includes the plurality of electrical contacts, wherein the receiving housing comprises a height less than or equal to a height of the memory module.

Memory subsystem 560, according to embodiments of the invention, further includes a memory module having a housing with a plurality of sides, a first plurality of memory chips/modules included in the housing, a second plurality of memory modules included in the housing, a first plurality of memory module electrical connectors for coupling the first plurality of memory modules to PCB, and a second plurality of memory module electrical connectors for coupling the second plurality of memory modules to the PCB. In embodiments of the invention, the above described first and second pluralities of memory module electrical connectors are disposed on different sides of the housing.

Connectivity 570 includes hardware devices (e.g., wireless and/or wired connectors and communication hardware) and software components (e.g., drivers, protocol stacks) to enable device 500 to communicate with external devices. The device could be separate devices, such as other computing devices, wireless access points or base stations, as well as peripherals such as headsets, printers, or other devices.

Connectivity 570 can include multiple different types of connectivity. To generalize, device 500 is illustrated with cellular connectivity 572 and wireless connectivity 574. Cellular connectivity 572 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity 574 refers to wireless connectivity that is not cellular, and can include personal area networks (such as Bluetooth), local area networks (such as WiFi), and/or wide area networks (such as WiMax), or other wireless communication.

Peripheral connections 580 include hardware interfaces and connectors, as well as software components (e.g., drivers, protocol stacks) to make peripheral connections. It will be understood that device 500 could both be a peripheral device ("to" 582) to other computing devices, as well as have peripheral devices ("from" 584) connected to it. Device 500 commonly has a "docking" connector to connect to other computing devices for purposes such as managing (e.g., downloading and/or uploading, changing, synchronizing) content on device 500. Additionally, a docking connector can allow device 500 to connect to certain peripherals that allow device 500 to control content output, for example, to audiovisual or other systems.

In addition to a proprietary docking connector or other proprietary connection hardware, device 500 can make peripheral connections 580 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

Embodiments of the invention describe a memory module comprising a memory card housing having a plurality of sides, a first plurality of memory devices included in the memory card housing, a second plurality of memory devices included in the memory card housing, a first plurality of memory module electrical terminals for coupling the first plurality of memory devices to a computing device printed circuit board (PCB), and a second plurality of memory module electrical terminals for coupling the second plurality of memory devices to the computing device PCB. In the above described embodiments, the first and second plurality of memory module electrical terminals are disposed on different sides of the memory card housing.

In some embodiments, the different sides of the memory card housing including the first and second plurality of memory module electrical terminals each comprise exterior sides of the memory card housing. In other embodiments, the different sides of the memory card housing including the first and second plurality of memory module electrical terminals each comprise interior sides of the memory card housing. Embodiments of the invention also include memory modules as described above wherein the sides of the memory card housing including the first and second plurality of memory module electrical terminals comprises first and second opposing sides of the housing.

In some embodiments, the above described first and second pluralities of memory devices each comprise Dynamic Random Access Memory (DRAM) memory chips; in other embodiments, the first and second plurality of memory devices each comprise phase change memory (PCM) memory chips. The above described memory card housing may comprise a Small Outline Dual In-line Memory Module (SODIMM) memory card housing.

Embodiments of the invention describe a computing device printed circuit board (PCB) comprising a memory bus to receive signal data from a channel of memory devices of a memory module via a plurality of electrical terminals on the memory module, a plurality of electrical contacts, communicatively coupled to the memory bus, for coupling the PCB to the plurality of electrical terminals on the memory module, and a receiving housing, including the plurality of electrical contacts, for securely coupling the memory module to the computing device PCB. In the above described embodiments, said receiving housing comprises a height less than or equal to a height of the memory module.

In some embodiments, the plurality of electrical contacts comprises a plurality of compression connectors having elastic springback properties for securely coupling the memory module to the computing device PCB. In some embodiments, the receiving housing includes the plurality of electrical contacts, and one or more screws to securely couple the memory module to the PCB.

In some embodiments, said memory bus is to further receive signal data from a second channel of memory devices of the memory module via a second plurality of electrical terminals on the memory module; in these embodiments, the computing device PCB may further comprise a second plurality of electrical contacts, communicatively coupled to the memory bus, for coupling the PCB to the second plurality of electrical terminals on the memory module.

In some embodiments, the pluralities of electrical contacts are positioned for securely coupling exterior sides of the memory module to the computing device PCB. In other embodiments, the pluralities of electrical contacts are positioned for securely coupling interior sides of the memory module to the computing device PCB. Said receiving housing may also be configured to receive Small Outline Dual In-line Memory Module (SODIMM) memory.

Embodiments of the invention describe systems including a motherboard printed circuit board (PCB), including a first and a second plurality of electrical contacts, and a memory module. Said memory module includes a memory card housing having a plurality of sides, a first plurality of memory devices included in the memory card housing, and a second plurality of memory devices included in the memory card housing, a first plurality of memory module input/output (I/O) electrical terminals for coupling the first plurality of memory devices to the first plurality of electrical contacts of the motherboard PCB, and a second plurality of memory module I/O electrical terminals for coupling the second plurality of memory devices to the second plurality of electrical contacts of the motherboard PCB; in these embodiments, the first and second plurality of memory module I/O electrical terminals are included on different sides of the memory card housing. The above described system further includes an antenna, and radio frequency circuitry coupled to the antenna to receive signal data to be processed by the system.

In some embodiments, the above described sides of the memory card housing of the memory module of said system including the first and second plurality of memory module electrical terminals comprises first and second opposing sides of the memory card housing.

In some embodiments, the above described first and second plurality of memory chips of the memory module said system each comprise Dynamic Random Access Memory (DRAM) memory chips—e.g., synchronous DRAM (SDRAM) memory chips. In other embodiments, said first and second plurality of memory chips of the memory module each comprise phase change memory (PCM) memory chips. Said memory card housing of the memory module may comprise a Small Outline Dual In-line Memory Module (SODIMM) memory card housing.

Various components referred to above as processes, servers, or tools described herein may be a means for performing the functions described. Each component described herein includes software or hardware, or a combination of these. Each and all components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

A computer readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable non-transitory storage medium may also include a storage or database from which content can be downloaded. Said computer readable medium may also include a device or product having content stored thereon at a time of sale or delivery. Thus, delivering a device with stored content, or offering content for download over a communication medium may be understood as providing an article of manufacture with such content described herein.

The invention claimed is:
1. A memory module, comprising:
   a memory card having a plurality of sides;
   a first plurality of memory devices disposed on a side of the memory card;
   a second plurality of memory devices disposed on the side of the memory card;
   a first plurality of memory module electrical terminals to couple the first plurality of memory devices to a computing device printed circuit board (PCB); and
   a second plurality of memory module electrical terminals to couple the second plurality of memory devices to the computing device PCB, wherein the first and second plurality of memory module electrical terminals extend from different other sides of the memory card such that the first plurality of memory module electrical terminals and the second plurality of memory module electrical terminals do not face a same direction and wherein the first plurality of memory module electrical terminals and the second plurality of memory module electrical terminals do not lie substantially higher than respective heights of the first and second plurality of memory devices so that the memory module maintains a low profile.

2. The memory module of claim 1, wherein the first and second plurality of memory module electrical terminals are integrated with exterior sides of a memory card housing.

3. The memory module of claim 1, wherein the first and second plurality of memory module electrical terminals are integrated with interior sides of a memory card housing.

4. The memory module of claim 1, wherein the first and second plurality of memory module electrical terminals extend from opposing sides of a memory card housing.

5. The memory module of claim 1, wherein the first and second pluralities of memory devices each comprise Dynamic Random Access Memory (DRAM) memory chips.

6. The memory module of claim 1, wherein the first and second plurality of memory devices each comprise phase change memory (PCM) memory chips.

7. The memory module of claim 1, wherein the memory module comprises a Small Outline Dual In-line Memory Module (SODIMM) memory card housing.

8. A computing device printed circuit board (PCB) comprising:
- a memory bus to receive signal data from a channel of memory devices of a memory module via a plurality of electrical terminals on the memory module, the memory module having first and second planar faces that are substantially larger than other planar faces of the memory module, the PCB having first and second planar faces that are substantially larger than other planar faces of the PCB;
- a plurality of electrical contacts, communicatively coupled to the memory bus, for coupling the PCB to the plurality of electrical terminals on the memory module; and
- a receiving housing, including the plurality of electrical contacts, to securely couple the memory module to the computing device PCB such that the first and second planar faces of the memory module and the first and second planar faces of the computing device PCB lay along a same plane, wherein the receiving housing comprises a height less than or equal to a height of the memory module so that the memory module maintains a low profile when connected to the receiving housing.

9. The computing device PCB of claim 8, wherein the plurality of electrical contacts comprises a plurality of compression connectors having elastic springback properties to securely couple the memory module to the computing device PCB.

10. The computing device PCB of claim 8, wherein the receiving housing includes the plurality of electrical contacts and one or more screws to securely couple the memory module to the PCB.

11. The computing device PCB of claim 8, wherein the memory bus is to further receive signal data from a second channel of memory devices of the memory module via a second plurality of electrical terminals on the memory module, the computing device PCB further comprising:
- a second plurality of electrical contacts, communicatively coupled to the memory bus, to couple the PCB to the second plurality of electrical terminals on the memory module.

12. The computing device PCB of claim 11, wherein the pluralities of electrical contacts are positioned to securely couple exterior sides of the memory module to the computing device PCB.

13. The computing device PCB of claim 11, where the pluralities of electrical contacts are positioned to securely couple interior sides of the memory module to the computing device PCB.

14. The computing device PCB of claim 8, wherein the receiving housing is configured to receive Small Outline Dual In-line Memory Module (SODIMM) memory.

15. A system comprising:
- a motherboard printed circuit board (PCB), including a first and a second plurality of electrical contacts;
- a memory module including:
  - a memory card having a plurality of sides;
  - a first plurality of memory devices disposed on a side of the memory card;
  - a second plurality of memory devices disposed on the side of the memory card;
  - a first plurality of memory module input/output (I/O) electrical terminals to couple the first plurality of memory devices to the first plurality of electrical contacts of the motherboard PCB; and
  - a second plurality of memory module I/O electrical terminals to couple the second plurality of memory devices to the second plurality of electrical contacts of the motherboard PCB, wherein the first and second plurality of memory module I/O electrical terminals extend from different other sides of the memory card such that the first plurality of memory module electrical terminals and the second plurality of memory module electrical terminals do not face a same direction and wherein the first plurality of memory module electrical terminals and the second plurality of memory module electrical terminals do not lie substantially higher than respective heights of the first and second plurality of memory devices such that the memory module maintains a low profile;
- an antenna; and
- radio frequency circuitry coupled to the antenna to receive signal data to be processed by the system.

16. The system of claim 15, wherein the first and second plurality of memory module electrical terminals are integrated with opposing sides of the memory card housing.

17. The system of claim 15, wherein the first and second plurality of memory chips of the memory module each comprise Dynamic Random Access Memory (DRAM) memory chips.

18. The system of claim 17, wherein at least one of the first or the second plurality of memory chips of the memory module comprises synchronous DRAM (SDRAM) memory chips.

19. The system of claim 15, wherein the first and second plurality of memory chips of the memory module each comprise phase change memory (PCM) memory chips.

20. The system of claim 15, wherein the memory module comprises a Small Outline Dual In-line Memory Module (SODIMM) memory card housing.

* * * * *

UNITED STATES PATENT AND TRADEMARK OFFICE
CERTIFICATE OF CORRECTION

PATENT NO. : 9,516,755 B2  
APPLICATION NO. : 13/730505  
DATED : December 6, 2016  
INVENTOR(S) : Lam et al.

Page 1 of 1

It is certified that error appears in the above-identified patent and that said Letters Patent is hereby corrected as shown below:

On the Title Page

At (57) Abstract: at Line 13, delete "EO" and insert -- I/O --.

At (57) Abstract: at Line 16, delete "EO" and insert -- I/O --.

Signed and Sealed this  
Twenty-sixth Day of September, 2017

Joseph Matal  
*Performing the Functions and Duties of the*  
*Under Secretary of Commerce for Intellectual Property and*  
*Director of the United States Patent and Trademark Office*